United States Patent [19]

Saka et al.

[11] Patent Number: 5,718,598

[45] Date of Patent: Feb. 17, 1998

[54] ELECTRICAL CONNECTION BOX AND CONTACT BONDING TERMINAL USED THEREFOR

[75] Inventors: Yuuji Saka; Nori Inoue; Takahiro Onizuka; Yoshito Oka; Makoto Kobayashi, all of Yokkaichi, Japan

[73] Assignee: Sumitomo Wiring Systems, Ltd., Yokkaichi, Japan

[21] Appl. No.: 578,958

[22] Filed: Dec. 27, 1995

[30] Foreign Application Priority Data

Dec. 29, 1994 [JP] Japan .................. 6-339749

[51] Int. Cl.$^6$ .................................. H01R 4/26
[52] U.S. Cl. .......................... 439/404; 439/949
[58] Field of Search .................. 439/76.2, 949, 439/881, 749

[56] References Cited

U.S. PATENT DOCUMENTS

| | | | |
|---|---|---|---|
| Re. 26,646 | 8/1969 | Evans | 439/80 |
| Re. 26,837 | 3/1970 | Evans | 439/80 |
| 2,360,917 | 10/1944 | Wade | 439/749 |
| 3,269,805 | 8/1966 | Evans | 428/596 |
| 3,270,251 | 8/1966 | Evans | 439/80 |
| 3,622,954 | 11/1971 | Hovnanian | 439/865 |
| 4,252,397 | 2/1981 | Eigenbrode et al. | 439/874 |
| 4,897,042 | 1/1990 | Saka et al. | 439/404 |
| 4,950,168 | 8/1990 | Watanabe et al. | 439/34 |
| 5,082,452 | 1/1992 | Takano | 439/850 |
| 5,207,587 | 5/1993 | Hamill et al. | 439/76.2 |

FOREIGN PATENT DOCUMENTS

| | | |
|---|---|---|
| 1-166419 | 11/1989 | Japan . |
| 2-136989 | 11/1990 | Japan . |
| 6-197432 | 7/1994 | Japan . |
| 6-351132 | 12/1994 | Japan . |
| 291992 | 6/1928 | United Kingdom . |

Primary Examiner—Neil Abrams
Assistant Examiner—T. C. Patel
Attorney, Agent, or Firm—Greenblum & Bernstein, P.L.C.

[57] ABSTRACT

An electrical connection box having an internal circuit includes a first circuit having a large current carrying capacity and a second circuit having a small current carrying capacity. The first circuit includes wires each having stranded conductors and contact bonding terminals contact bonded to the stranded conductors and the second circuit includes a single conductor and pressing contact terminals.

3 Claims, 8 Drawing Sheets

Fig.3
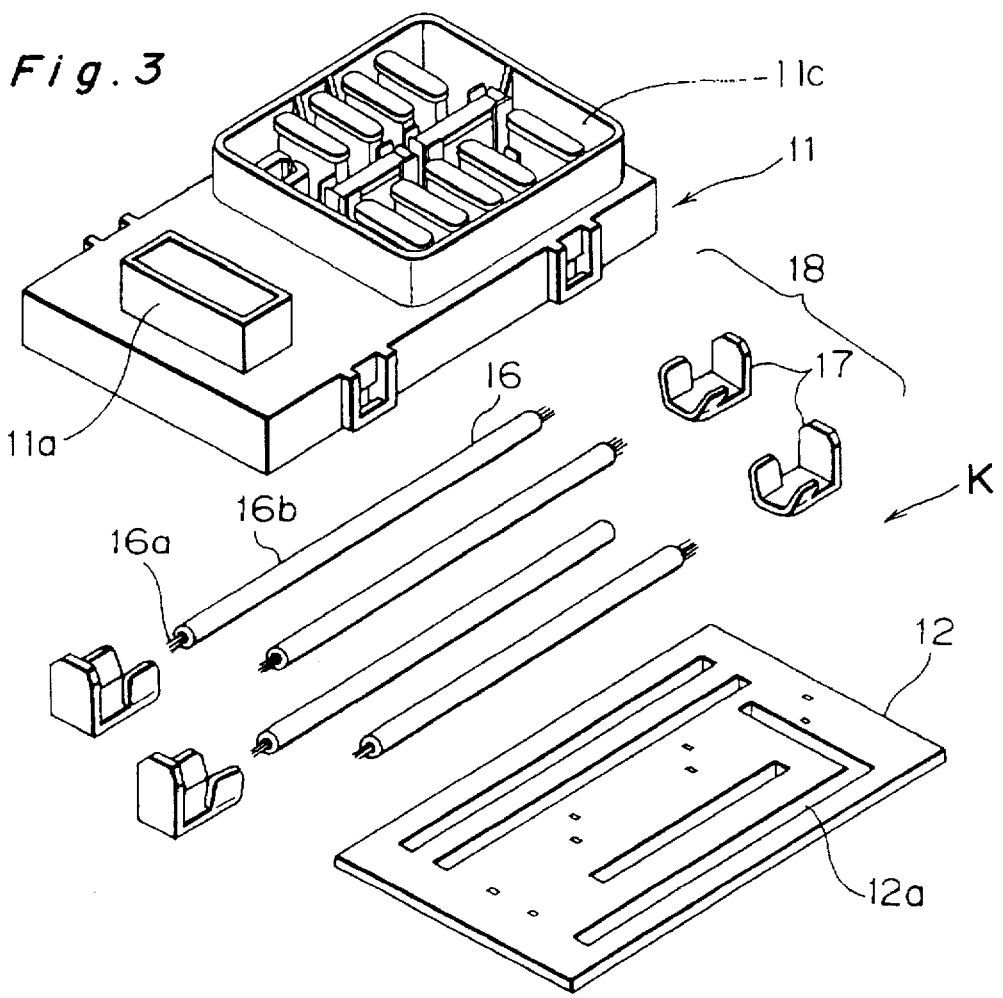
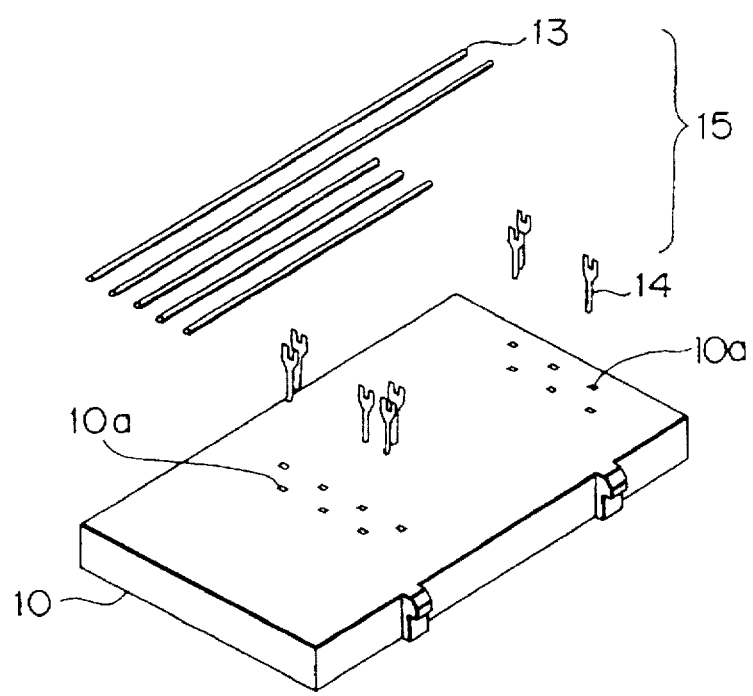

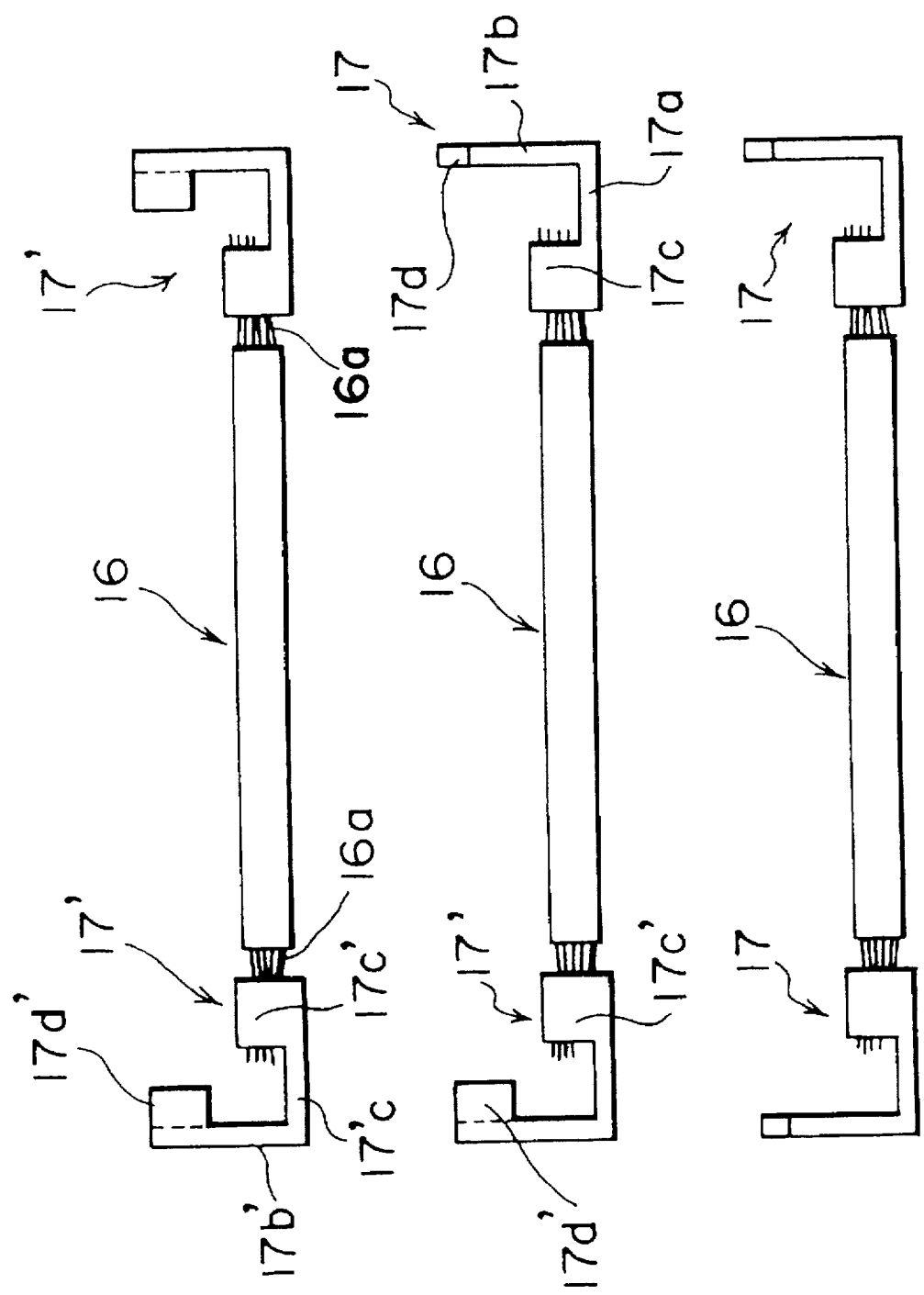

ELECTRICAL CONNECTION BOX AND CONTACT BONDING TERMINAL USED THEREFOR

BACKGROUND OF THE INVENTION

The present invention generally relates to electrical connection boxes for motor vehicles and more particularly, to an electrical connection box such as a junction box in which electric circuits including a number of fuses and relays are provided in a concentrated manner such that branching connection of wiring harnesses is performed reasonably by employing an internal circuit constituted by only wires and terminals without the need for using bus bars hitherto employed as the internal circuit.

In order to easily cope with design changes of an internal circuit of a conventional electrical connection box of this kind, connection between the wires and the external terminals and connection between the wires are performed by pressing contact terminals in place of a portion of bus bars formed by blanking electrically conductive metal plates. At this time, since connection between the wires and the terminals should be performed stably at all times, single-conductor wires each having a single conductor are employed and are brought into pressing contact with pressing contact terminals so as to be electrically connected to the pressing contact terminals. Namely, in case each wire has a stranded conductors, it is difficult to keep the area of contact between the wires and the pressing contact terminals constant at all times, so that the wires each having the stranded conductors are not employed.

Usually, the single-conductor wire has a maximum cross-sectional area of 0.85 mm$^2$ and thus, large electric current cannot flow through the single-conductor wire. Therefore, bus bars are used for a portion of the internal circuit of the electrical connection box having large current carrying capacity, for example, a power circuit disposed upstream of the fuses and the relays. As shown in FIG. 1 illustrating a known electrical connection box proposed in Japanese Utility Model Laid-Open Publication Nos. 1-166419 (1989) and 2-136989 (1990), bus bars are employed for a power circuit 1 disposed upstream of fuses 4, while a load circuit 2 disposed downstream of the fuses 4 and having small current carrying capacity is formed by wires and pressing contact terminals. More specifically, as shown in FIG. 2, bus bars B are employed for the power circuit, while wires W and pressing contact terminals T are used for a load circuit. In FIG. 2, reference characters "L", "U", "F" and "I" denote a lower casing, an upper casing, a fuse and an insulating plate, respectively.

However, in case the bus bars are used for the power circuit as described above, design changes of the power circuit should be made frequently in case the power circuit is used in common for other types of motor vehicles. At this time, as compared with a case in which the circuit is formed by the wires and terminals, it is impossible to easily cope with design changes of the power circuit.

Furthermore, in case a circuit formed by the wires and the pressing contact terminals and a circuit formed by the bus bars are used in combination, such problems arise that a die for forming the bus bars is required to be prepared and a wiring die should be provided, thereby resulting in a sharp rise in production cost of the electrical connection box. Meanwhile, since two kinds of circuits having different configurations are required to be installed in the electrical connection box, the electrical connection box becomes complicated structurally. Furthermore, since arrangements for installing the two circuits in the electrical connection box are different from each other, the number of steps for installing the two circuits in the electrical connection box increases, thus also resulting in a rise of production cost of the electrical connection box.

Moreover, such an inconvenience is incurred that a splice portion cannot be easily obtained from a single bus bar. When the circuit formed by the wires and the pressing contact terminals and the circuit formed by the bus bars are used in combination, this also prevents easy design changes of the power circuit.

SUMMARY OF THE INVENTION

Accordingly, an essential object of the present invention is to provide, with a view to eliminating the above mentioned drawbacks of conventional electrical connection boxes, an electrical connection box in which a power circuit hitherto formed by bus bars and having large current carrying capacity is constituted by wires and terminals such that not only is it possible to easily cope with design changes of an internal circuit of the electrical connection box but production cost of the electrical connection box can be lowered.

In order to accomplish this object of the present invention, an electrical connection box according to the present invention has an internal circuit which includes a circuit having a large current carrying capacity, the improvement comprising: the circuit being constituted by wires each having stranded conductors and contact bonding terminals contact bonded to the stranded conductors of the wires.

Since a large electric current can be caused to flow through the wires each having the stranded conductors, the wires can be used for a power circuit. Meanwhile, since barrels of the contact bonding terminals are contact bonded to the wires each having the stranded conductors, the contact bonding terminals can be electrically connected to the wires positively.

Meanwhile, the internal circuit of the electrical connection box includes a first circuit having a large current carrying capacity and a second circuit having a small current carrying capacity; the internal circuit being wholly constituted by wires and terminals connected to the wires; the first circuit being constituted by first wires each having stranded conductors and contact bonding terminals contact bonded to the stranded conductors of the first wires; the second circuit being constituted by second wires each having a single conductor and pressing contact terminals brought into pressing contact with the conductors of the second wires.

Since the internal circuit of the electrical connection box is wholly constituted by the wires and the terminals connected to the wires by eliminating bus bars, it is possible to easily cope with design changes of not only a power circuit but a load circuit. Especially, since the wires are used for the internal circuit, splicing of the internal circuit can be adjustably performed.

Meanwhile, the contact bonding terminal for use in the electrical connection box comprises: a horizontal base plate; a vertical base plate which intersects with the horizontal base plate orthogonally; a barrel which is provided on the horizontal base plate and is contact bonded to stranded conductors exposed at a distal end of a wire used for an internal circuit of the electrical connection box; and a male terminal which has a shape of a tab and is provided at a distal end of the vertical base plate so as to be fitted into an external female terminal or a female terminal which is provided at a distal end of the vertical base plate so as to receive an external male terminal having a shape of a tab. The female terminal is, for example, formed by a pair of elastic pieces turned down from opposite sides of the vertical base plate such that the external male terminal having the shape of the tab is press fitted into a gap between the vertical base plate and the elastic pieces.

By the above described arrangement of the contact bonding terminal, the barrel provided at one end of the contact bonding terminal is contact bonded to the stranded conductors of each of the wires so as to be electrically connected to the stranded conductors of each of the wires, while the male terminal or the female terminal provided at the other end of the contact bonding terminal is connected to the external terminal. By using this contact bonding terminal, the conductors exposed at distal ends of a plurality of the wires can be contact bonded to each other at a time so as to be spliced to each other. Meanwhile, if the female terminal is provided at the vertical base plate, the need for a relay terminal having a pair of female terminals provided at its opposite ends can be eliminated when the contact bonding terminal is connected to the external male terminal having the shape of the tab.

BRIEF DESCRIPTION OF THE DRAWINGS

This object and features of the present invention will become apparent from the following description taken in conjunction with the preferred embodiment thereof with reference to the accompanying drawings, in which:

FIG. 3 is an exploded perspective view of an electrical connection box according to one embodiment of the present invention;

FIGS. 10, 11 and 12 are side elevational views showing three arrangements of connection between the wire and the contact bonding terminals of FIGS. 4 and 7, respectively.

Before the description of the present invention proceeds, it is to be noted that like parts are designated by like reference numerals throughout several views of the accompanying drawings.

DETAILED DESCRIPTION OF THE INVENTION

Figure 1:
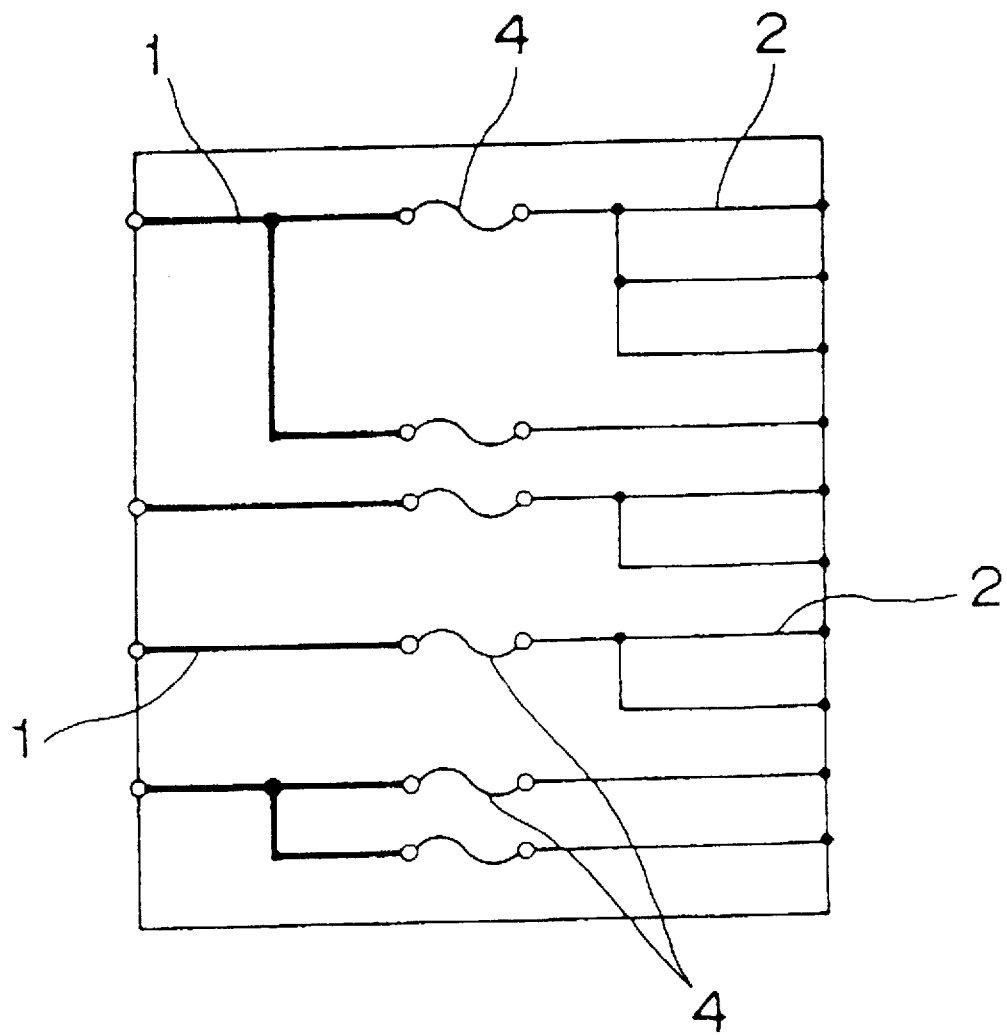
FIG. 1 is a schematic view showing configuration of an internal circuit of a prior art electrical connection box (already referred to)
Figure 2:
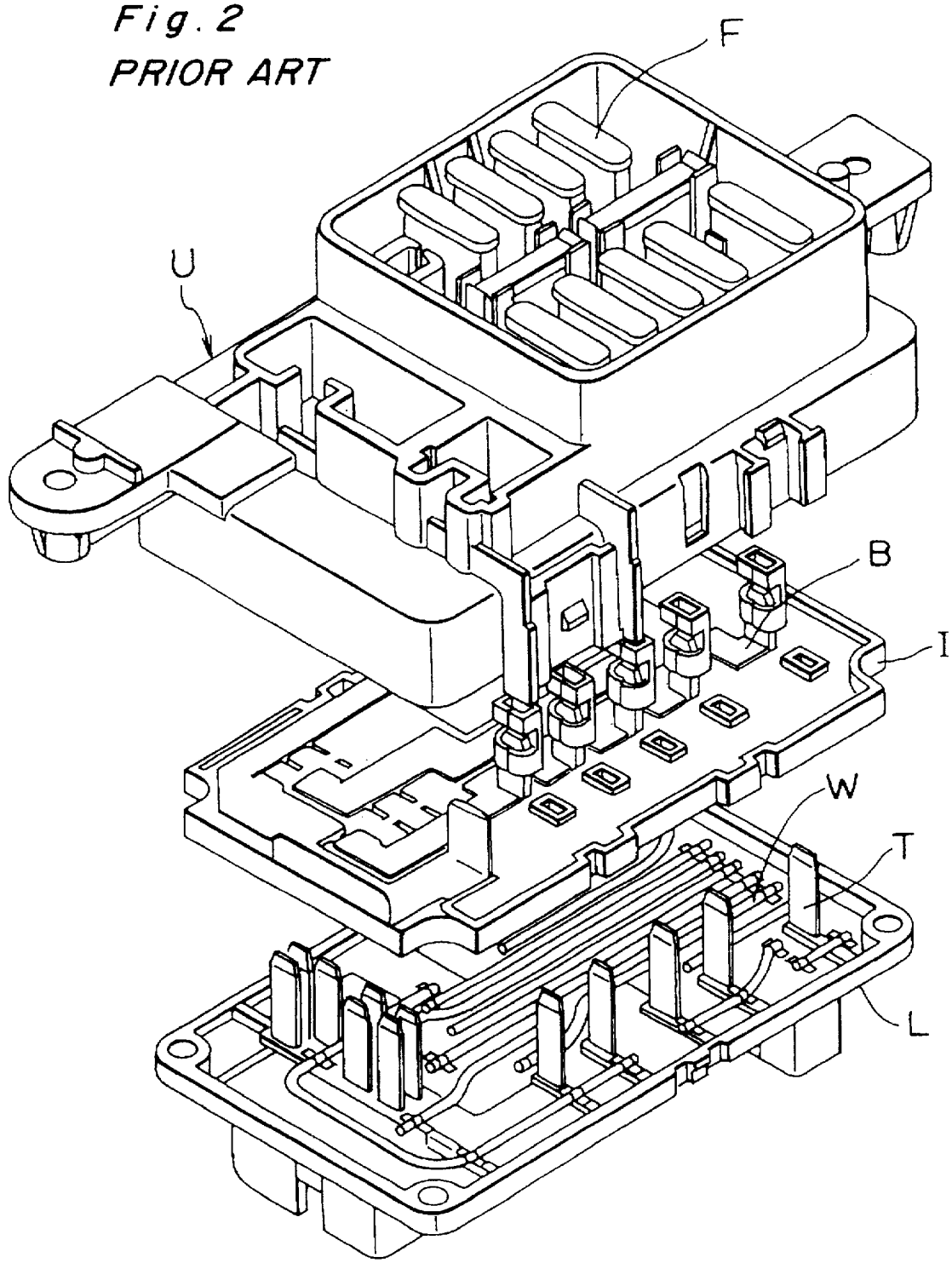
FIG. 2 is an exploded perspective view of the prior art electrical connection box of FIG. 1 (already referred to)

Referring now to the drawings, there is shown in FIG. 3, an electrical connection box K according to one embodiment of the present invention. FIG. 3 shows the electrical connection box K prior to its assembly. The electrical connection box K includes a lower casing 10, an upper casing 11 and an insulating plate 12. Thus, the lower casing 10 and the upper casing 11 form a casing of the electrical connection box K. At a lower portion of the casing of the electrical connection box K enclosed by the lower casing 10 and the insulating plate 12, a load circuit 15 formed by a plurality of wires 13 each having a single conductor and a plurality of pressing contact terminals 14 brought into pressing contact with the wires 13 is provided. On the other hand, at an upper portion of the casing of the electrical connection box K enclosed by the insulating plate 12 and the upper casing 11, a power circuit 18 formed by a plurality of wires 16 each having stranded conductors and a plurality of contact bonding terminals 17 is provided.

Figure 4:
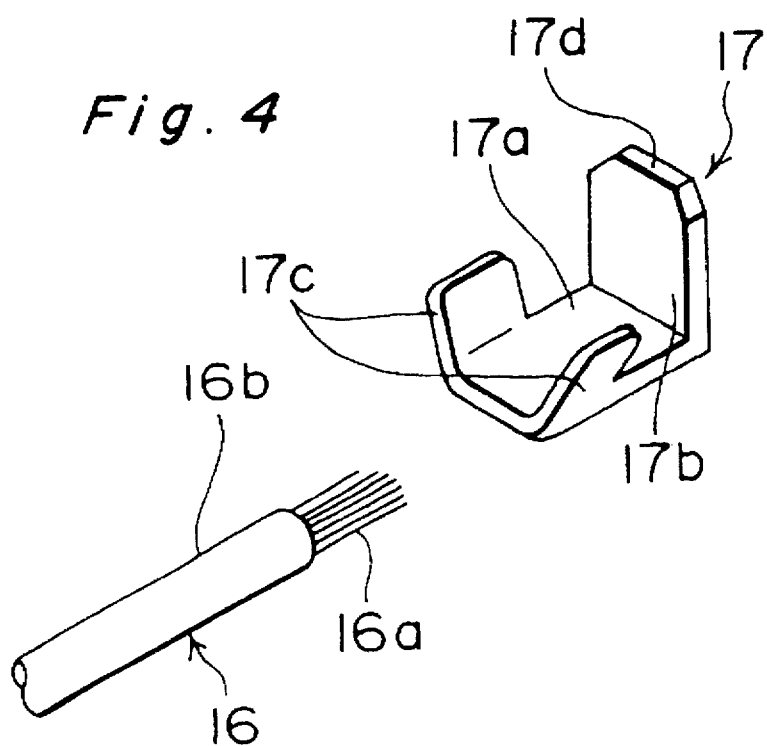
FIG. 4 is an exploded perspective view of one example of a contact bonding terminal and a wire employed in the electrical connection box of FIG. 3.
Figure 5:
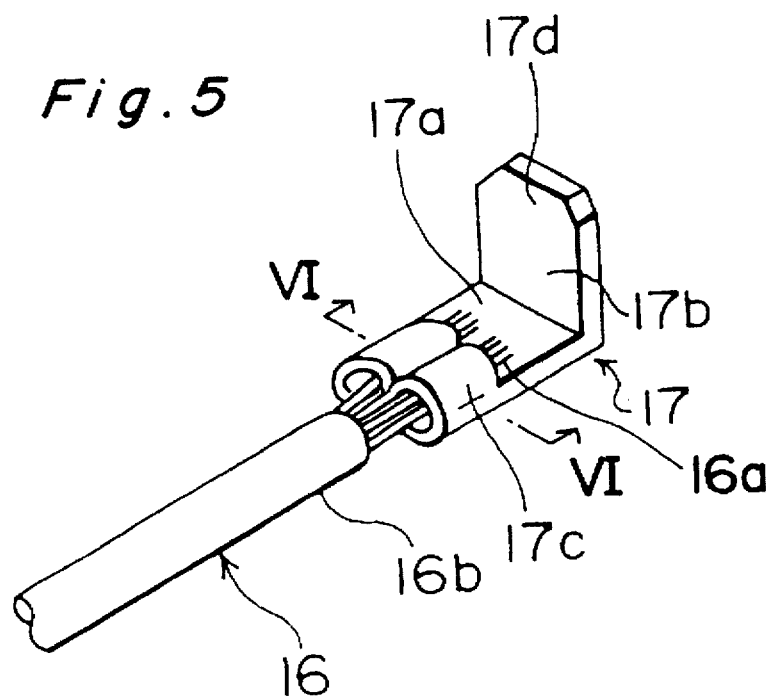
FIG. 5 is a perspective view showing contact bonding between the contact bonding terminal and the wire of FIG. 4.
Figure 6:
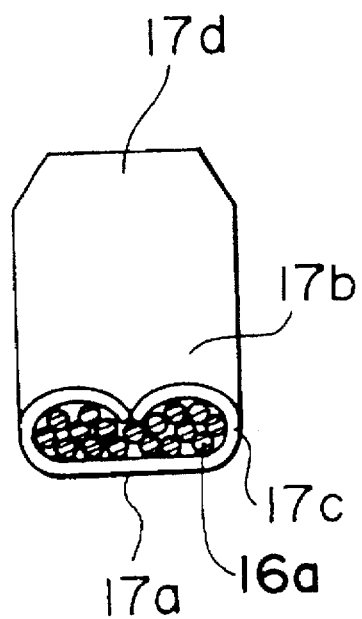
FIG. 6 is a sectional view taken along the line VI—VI in FIG. 5.
Figure 7:
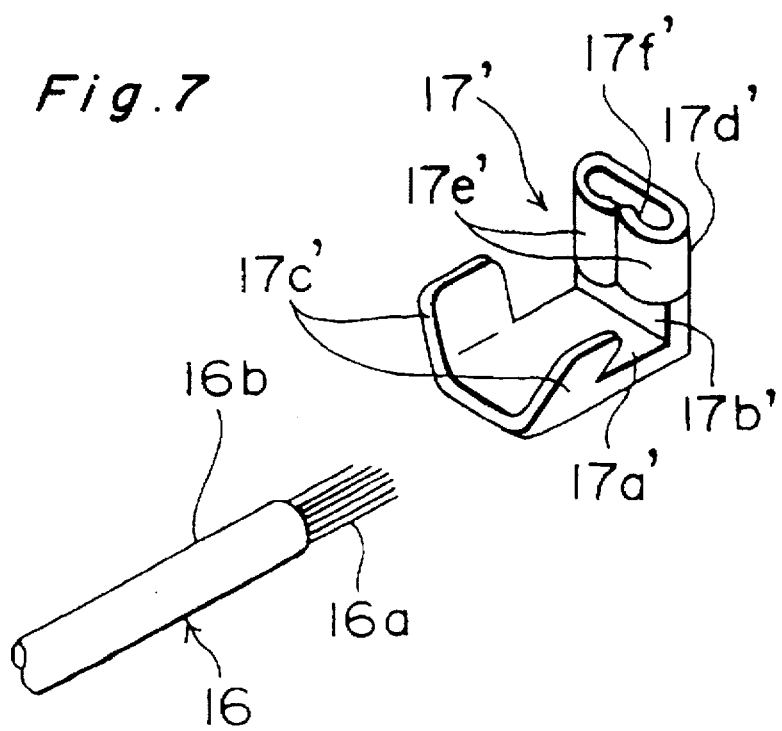
FIG. 7 is an exploded perspective view of another example of a contact bonding terminal and a wire employed in the electrical connection box of FIG. 3.
Figure 8:
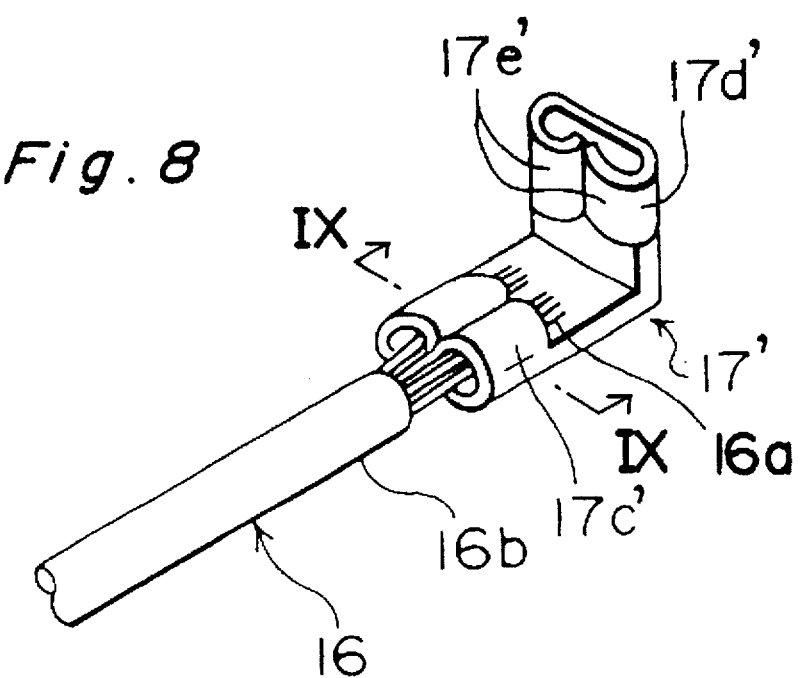
FIG. 8 is perspective view showing contact bonding between the contact bonding terminal and the wire of FIG. 7.
Figure 9:
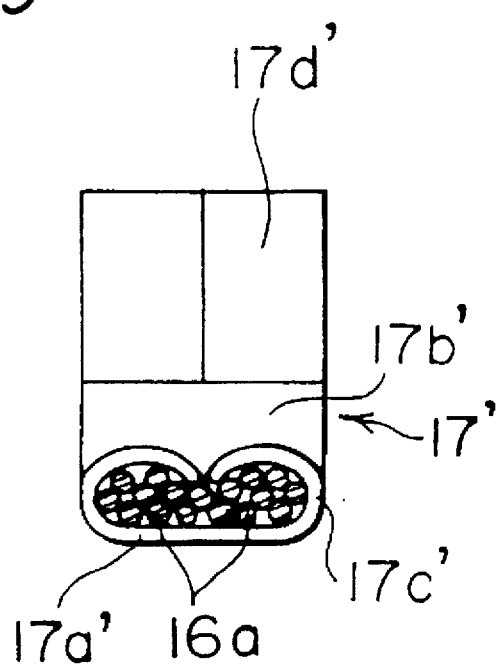
FIG. 9 is a sectional view taken along the line IX—IX in FIG. 8.

As shown in FIGS. 4 to 6, each of the wires 16 of the power circuit 18 has a number of stranded conductors 16a whose outer periphery is covered by an insulating coating 16b. Current carrying capacity of the wires 16 is so set as to be equal to that of the power circuit 18. The insulating coating 16b is removed from a distal end of each of the wires 16 so as to expose the stranded conductors 16a such that the exposed stranded conductors 16a are contact bonded to each of the contact bonding terminals 17.

Each of the contact bonding terminals 17 is formed by blanking an electrically conductive metal plate and then, bending the blanked metal plate and includes a horizontal base plate 17a and a vertical base plate 17b which intersect with each other orthogonally. A pair of barrels 17c are projected from opposite sides of a distal end portion of the horizontal base plate 17a. Meanwhile, a male terminal 17d having a shape of a tab is provided at an upper end portion of the vertical base plate 17b. By staking the barrels 17c to the exposed stranded conductors 16b, the barrels 17c are contact bonded to the exposed stranded conductors 16b such that the contact bonding terminal 17 is connected to the wire 16.

The wire 16 of FIG. 3 is connected to the contact bonding terminal 17 having the male terminal 17d. However, the contact bonding terminal 17 may be replaced by a contact bonding terminal 17' having a female terminal 17d'. The contact bonding terminal 17' includes a horizontal base plate 17a' and a vertical base plate 17b'. In the same manner as the contact bonding terminal 17d, a pair of barrels 17c' are provided at the horizontal base plate 17d' and the female terminal 17d' is provided at an upper end portion of the vertical base plate 17b'. The female terminal 17d' is obtained by turning down towards the vertical base plate 17b' a pair of pieces 17e' projecting from opposite sides of the vertical base plate 17b' such that an external terminal (not shown) is press fitted into a gap 17f enclosed by the pieces 17e' and the vertical base plate 17b'.

The contact bonding terminals 17 and 17' may be contact bonded to the stranded conductors 16a exposed at each of opposite ends of the wire 16 in three different ways as shown in FIGS. 10 to 12, respectively. Namely, in FIG. 10, the contact bonding terminal 17' having the female terminal 17d' is contact bonded to the stranded conductors 16a at each of the opposite ends of the wire 16. Meanwhile, in FIG. 11, the contact bonding terminal 17d having the male terminal 17d is contact bonded to the stranded conductors 16a at one of the opposite ends of the wire 16, while the contact bonding terminal 17' having the female terminal 17d' is contact bonded to the stranded conductors 16a at the other of the opposite ends of the wire 16. In FIG. 12, the contact bonding terminal 17 having the male terminal 17d is contact bonded to the stranded conductors 16a at each of the opposite ends of the wire 16.

Meanwhile, in the contact bonding terminals 17 and 17', only the barrels 17c and 17c' for receiving the stranded conductors 16a are provided. However, in the contact bonding terminals 17 and 17', it is needless to say that another barrel for receiving the insulating coating 16b may be further provided so as to be contact bonded to the insulating coating 16b.

Figure 13:
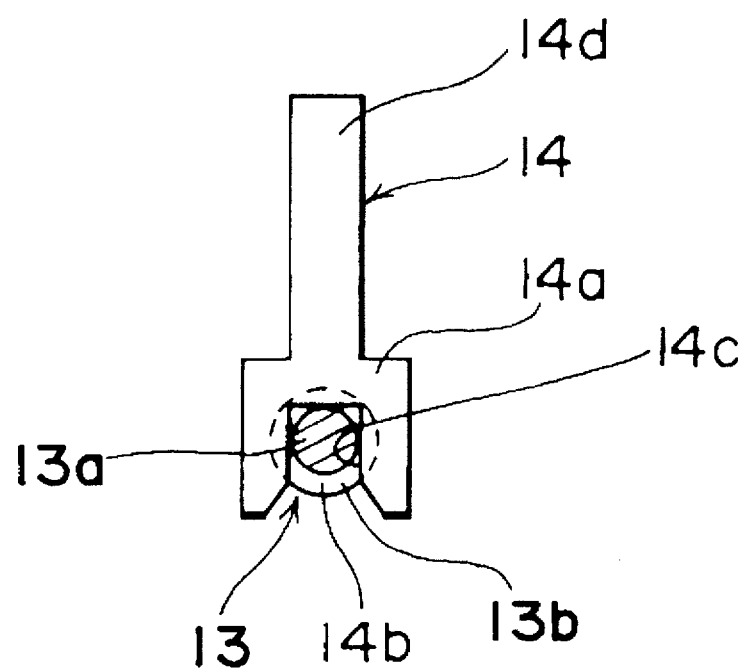
FIG. 13 is a partly sectional front elevational view of a pressing contact terminal and a wire in the electrical connection box of FIG. 3.

As shown in FIG. 13, the wire 13 for the load circuit 15 having small current carrying capacity has a single conductor 13a whose outer periphery is covered by an insulating coating 13b. The pressing contact terminal 14 connected to the single-conductor wire 13 includes a base plate 14a and a male terminal 14d provided at an upper end of the base plate 14a and having a shape of a tab. A slot 14b is formed at a lower end portion of the base plate 14a such that a blade 14c is formed at a peripheral edge of the slot 14b. The blade 14c is thrust into the insulating coating 13b so as to be brought into contact with the single conductor 13b.

In order to assemble the electrical connection box K, the male terminals 14d of the pressing contact terminals 14 are initially, respectively, inserted into terminal holes 10a formed preliminarily on the lower casing 10 so as to mount the pressing contact terminals 14 on the lower casing 10. Then, the wires 13 are laid along an inner face of the lower casing 10 so as to be connected to the pressing contact terminals 14 through pressing contact. The terminal holes 10a are formed on a bottom wall of a connector receiver (not shown) projecting from the lower casing 10. Thus, the male terminals 14d protrude into the connector receiver from the terminal holes 10a. Alternatively, wiring grooves may be formed on the inner face of the lower casing 10 or a lower face of the insulating plate 12. In this case, after the wires 13 have been laid in the wiring grooves, the pressing contact terminals 14 are driven into the wires 13 so as to be connected to the wires 13.

After the load circuit 15 has been installed at the lower portion of the casing of the electrical connection box K between the lower casing 10 and the insulating plate 12, the wires 16 of the power circuit 18 are laid in wiring grooves 12a formed on an upper face of the insulating plate 12. The contact bonding terminals 17 and/or 17' are preliminarily contact bonded to the opposite end portions of each of the wires 16 as shown in FIGS. 10 to 12. Subsequently, the upper casing 11 is mounted on the lower casing 10 such that the male terminals 17d of the contact bonding terminals 17 protrude into a connector receiver 11a of the upper casing 11 from terminal holes (not shown) formed on a bottom wall of the connector receiver 11a. Meanwhile, the female terminals 17d' of the contact bonding terminals 17' are disposed below terminal holes of a fuse receiver 11c provided on the upper casing 11.

Thereafter, connectors (not shown) are mounted on the connector receiver of the lower casing 10 such that the male terminals 14d protruding from the terminal holes 10a into the connector receiver of the lower casing 10 are connected to female terminals of the connectors. Likewise, connectors (not shown) are mounted on the connector receiver 11a of the upper casing 11 such that the male terminals 17d protruding from the terminal holes into the connector receiver 11a of the upper casing 11 are connected to female terminals of the connectors. Meanwhile, male terminals each having a shape of a tab and projecting from fuses (not shown) mounted on the fuse receiver 11 are press fitted into the female terminals 17d' of the contact bonding terminals 17' so as to be connected to the female terminals 17d'.

Meanwhile, the fuses and the wires 13 of the load circuit 15 are connected to each other by connecting the male terminals 14d of the pressing contact terminals 14 and the male terminals of the fuses through relay terminals.

In the power circuit 18, the wires 16 can be spliced to each other easily by contact bonding the barrels 17c (17c') of the same contact bonding terminal 17 (17') to the stranded conductors 16a of a plurality of the wires 16 simultaneously. Furthermore, if the insulating coating 16b is removed from intermediate portions of the wires 16 and the intermediate portions of the wires 16 are contact bonded to each other by an intermediate relay, the wires 16 can be spliced to each other.

Meanwhile, in addition to the power circuit 18 disposed upstream of the fuses, circuits having large current carrying capacity, for example, a ground circuit and a relay circuit can be formed by the wires 16 and the contact bonding terminals 17 and 17'.

As is clear from the foregoing description of the electrical connection box of the present invention, since the circuit having large current carrying capacity such as the power circuit is constituted by the wires each having the stranded conductors and the contact bonding terminals, it is possible to cope with design changes of the circuit easily and inexpensively in comparison with a case in which the circuit having large current carrying capacity is formed by bus bars. For example, in case the internal circuit of the electrical connection box is required to be increased, a wire to be laid may be merely added to the internal circuit of the electrical connection box. Furthermore, since the wire is covered by the insulating coating, the wires can be laid so as to intersect with each other and thus, the casing of the electrical connection box is not required to be modified. In addition, although the bus bars cannot be bent easily, the wires can be easily bent so as to be laid in position.

Meanwhile, in the electrical connection box, the wires each having the stranded conductors are employed such that a large current flows through the wires. Furthermore, the contact bonding terminals are employed as the terminals connected to the wires and the barrels of each of the contact bonding terminals are staked to the stranded conductors of each of the wires so as to be contact bonded to the stranded conductors of each of the wires. Therefore, since a large contact area between the terminals and the conductors can be secured, reliability for effecting flow of large current through joints between the terminals and the conductors in comparison with the pressing contact terminals. Furthermore, in contact bonding of the conductors, since the wires may have a predetermined range of sizes by adjusting the amount of staking of the stranded conductors, wires of desired size can be used, thereby resulting in reduction of the production cost of the electrical connection box.

Moreover, if the wires are employed for the circuit having a large current carrying capacity, splicing can be performed at the opposite ends of each of the wires or at an intermediate portion of each of the wires and thus, it is possible to easily cope with design changes of the internal circuit of the electrical connection box.

Meanwhile, since the internal circuit of the electrical connection box is wholly constituted by the wires and the terminals connected to the wires, dies for forming the bus bars are not required to be provided at all, so that production cost of the dies can be eliminated, thus resulting in reduction of the production cost of the electrical connection box. In addition, in comparison with a case in which the internal circuit is formed by the bus bars and the wires in combination, internal construction of the electrical connection box can be simplified and operation for installing the internal circuit is also simplified.

Meanwhile, the contact boding terminal employed in the electrical connection box includes the horizontal base plate and the vertical base plate intersecting with each other orthogonally. Therefore, the horizontal base plate can be contact bonded to the wire, while the male terminal or the female terminal provided at the vertical base plate can be directly connected to the external terminal. Especially, in case the female terminal is provided at the vertical base plate, the female terminal can be connected to an external male terminal without the need for using a relay terminal, so that the number of components required for the electrical connection box can be reduced.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An electrical connection box comprising: an internal circuit which includes both a first circuit having a large current carrying capacity and a second circuit having a small current carrying capacity;

the internal circuit being wholly constituted by wires and terminals connected to the wires;

the first circuit being constituted by first wires each having stranded conductors and non-pressing contact bonding terminals having sections that are contact bonded to distal ends of the stranded conductors of the first wires; and the second circuit being constituted by second wires each having only a single conductor and pressing contact terminals brought into pressing non-bonded contact with the conductors of the second wires, the pressing contact terminals contacting a respective single conductor along its length.

2. The electrical connection box, according to claim 1, the contact bonding terminal comprising:

a horizontal base plate;

a vertical base plate which intersects with the horizontal base plate orthogonally;

a barrel which is provided on the horizontal base plate and is contact bonded to said stranded conductors exposed at a respective distal end of a wire used for the internal circuit of the electrical connection box; and a male terminal which has a shape of a tab and is provided at a distal end of the vertical base plate so as to be fitted into an external female terminal.

3. The electrical connection box, according to claim 1, the contact bonding terminal comprising:

a horizontal base plate;

a vertical base plate which intersects with the horizontal base plate orthogonally;

a barrel which is provided on the horizontal base plate and is contact bonded to said stranded conductors exposed at a respective distal end of a wire used for the internal circuit of the electrical connection box; and a female terminal which is provided at a distal end of the vertical base plate so as to receive an external male terminal having a shape of a tab.

* * * * *

UNITED STATES PATENT AND TRADEMARK OFFICE
CERTIFICATE OF CORRECTION

PATENT NO. : 5,718,598
DATED : February 17, 1998
INVENTOR(S) : Y. SAKA et al.

It is certified that error appears in the above-identified patent and that said Letters Patent is hereby corrected as shown below:

On the cover page of the printed patent, paragraph [75] Inventors, line 3, after "Yokkaichi" insert ---City---.

On the cover page of the printed patent, paragraph [73] Assignee, line 2, after "Yokkaichi" insert ---City---.

Signed and Sealed this

Eighth Day of September, 1998

Attest:

BRUCE LEHMAN

Attesting Officer     Commissioner of Patents and Trademarks